June 19, 1945. M. F. W. HEBERLEIN 2,378,848
PROCESS FOR THE RECOVERY OF INDIUM
Filed Nov. 4, 1944
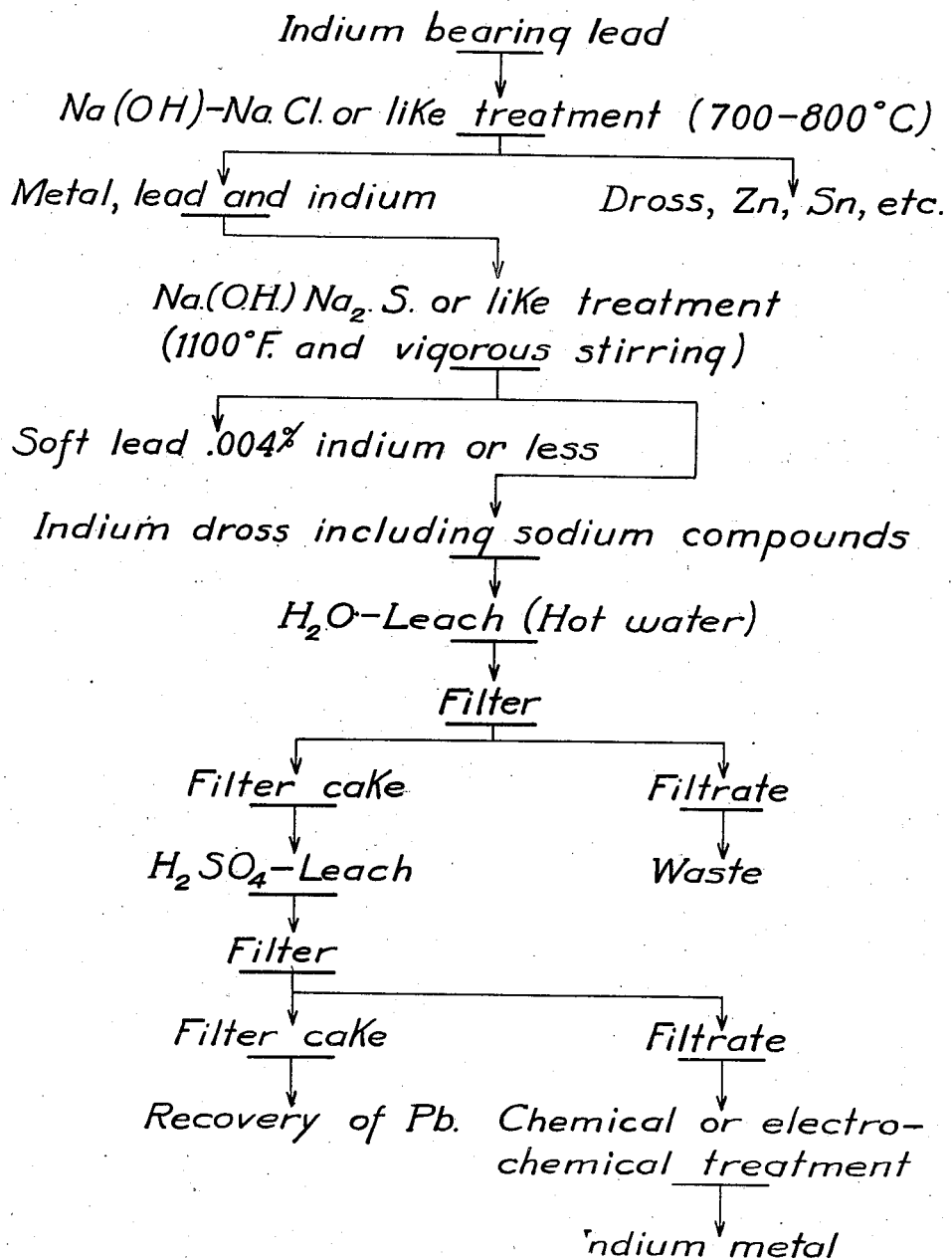
INVENTOR.
MAX F. W. HEBERLEIN.
BY Ward Crosby & Neal
his ATTORNEYS.

Patented June 19, 1945

2,378,848

UNITED STATES PATENT OFFICE 2,378,848

PROCESS FOR THE RECOVERY OF INDIUM

Max F. W. Heberlein, Rahway, N. J., assignor to The American Metal Company, Limited, New York, N. Y., a corporation of New York Application November 4, 1944, Serial No. 561,991

22 Claims. (Cl. 75—78)

This invention relates to a process for recovering indium and especially for recovering it from indium-bearing lead or lead alloys.

This application is a continuation-in-part of my copending application Serial No. 362,334, filed October 23, 1940.

Indium is one of the lesser known metals. It was discovered in 1863 but substantially no commercial interest in it has arisen until the last few years. I believe that indium was originally obtained by its discoverers by a wet chemical method. In the past few years some attempt has been made to recover indium present in concentrates from ores. These methods have involved complicated wet processes. In one of these processes, the indium was first collected in a metallic lead residue and this residue was treated with zinc or similar metal, since it was found that lead containing indium could not be dissolved in sulfuric acid because of the protective action of the lead preventing solution of the indium. Addition of zinc permitted solution in the acid. The mass of lead, zinc and indium was dissolved in sulfuric acid, requiring about one-half ton of sulfuric acid for each ton of lead so treated, and treatment of this solution to recover indium followed. This and other wet methods are expensive and complicated. So far as I am aware, no one up to the time of my invention has ever attempted to recover indium from such indium-containing lead, employing pyro-metallurgy.

The principal object of this invention accordingly is to provide a simple process for the recovery of indium from indium-bearing lead by a process employing pyro-metallurgy.

Since I have found, in accordance with my invention, that the chemical-metallurgical properties of indium are such that it will follow either zinc or tin or both, if these metals are present, I prefer to separate them from indium and lead at the commencement of the process. If indium, tin and zinc are removed simultaneously from the lead and collected in the same dross, the separation of these three metals by wet chemical methods causes considerable difficulties rendering such method impractical for plant operation. In accordance with my invention, accordingly, I prefer to remove tin, zinc, etc. from the impure lead and indium before it is treated for the recovery of indium. In making such separation, I may also remove arsenic and antimony.

Where the tin and zinc are previously so removed, there is always a small quantity of indium which passes into the tin-zinc dross and this may be lost for direct recovery. However, this dross may be re-treated and charged to the next kettle, or it may be recovered by some other method so that the total amount of indium lost by this procedure averages less than 2% of the original amount present. This loss may be considered negligible. Since most of the indium-bearing lead also contains tin and zinc and other impurities, as indicated above, the lead should first be treated for the elimination thereof.

In accordance with my invention, I have found that by treating molten lead containing indium with an alkali metal sulfide under proper conditions, the indium combines with sulfur, perhaps as $In_2S_3$ or some more complex compound which may contain alkali-metal such as sodium, and enters the dross. In this manner, the indium is removed from the bulk of the lead and the dross is then further treated for the recovery of indium.

In carrying out my invention, where lead alloys are employed containing one or more of the impurities, tin, zinc, antimony, or arsenic, or the like, any of the well-known methods for softening lead can be used for the elimination of such undesirable impurities. I have used a mixture for this purpose consisting of 1½ pounds of sodium hydroxide and ½ pound of sodium chloride for each pound of tin and zinc (combined) to be removed, which is ample for the preliminary treatment. A little nitre may be added to assist in oxidation reactions. During this treatment, the bath temperature is held at about 700–800° F.; the metal being stirred in a suitable kettle at a speed to create a strong vortex until the dross acquires a very thick and viscous consistency. The dross is then skimmed off, leaving the metal prepared for the removal of indium.

The treatment of molten lead for the production of a dross containing indium (after removal of impurities such as those above if present) is carried out, in accordance with my invention, to produce a compound of indium containing sulfur in said dross. The indium dross so produced may contain indium in two forms, namely, a form soluble in water-leach liquor and a water-insoluble form. Where the soluble form is produced, upon leaching the dross containing it, the indium along with other leach-liquor-soluble products will pass into solution and thereafter the indium must be separated from these other soluble materials. From a practical standpoint, the production of the water-insoluble form is more economical and is the practice which I now follow. The material which I employ in accordance with my invention for the production of the above dross is an alkali-metal sulfide, for example, but without limitation, sodium sulfide. In the employment of such sulfide, the indium can be transformed substantially completely to the water-insoluble form if the treatment therewith is carried out so as to decompose substantially all excess of the alkali sulfide employed as the treating reagent, above that required to combine with indium and other impurities with which it reacts. If this is not done, I have found that at least some of the indium present is soluble on leaching with water. I believe that the indium so dissolved is a sodium-sulfo-complex compound of indium, where sodium sulfide is used, but I cannot state unequivocally that such is the fact. I do know, however, that if the dross formed is heated at a suitable temperature under oxidizing conditions for a sufficient length of time, preferably with stirring, I no longer get a test from the dross for water-soluble sulfide and at that time the indium compound is substantially water-insoluble. I have devised the following method for testing for such soluble sulfide:

A sample of dross, say, 25 grams, was stirred into a beaker of warm water. If a dark green or blue green to black pulp resulted, the dross was considered to be high in available $Na_2S$. If it was white or gray turning green only after 3 to 5 minutes, the available free $Na_2S$ was considered negligible. These observations were checked by filtering the pulp and acidifying the filtrate. A strong odor of $H_2S$ was taken to indicate much free $Na_2S$ in the dross while a weak odor was considered proof for complete consumption of the sodium sulfide.

I have found in accordance with my invention that when operating on relatively small lots of material, oxidation by air of the dross on the kettle is sufficient, and I have noted that upon stirring the dross from such lots in the temperature range of 1000° to 1100° F., a strong glowing of the dross occurs due apparently to the violence of the oxidation of the alkali-metal sulfide and when this glowing ceases, the indium is in a water-insoluble form in the dross. In treating large amounts of lead in accordance with my invention, such air oxidation is replaced at least in part by oxidation with sodium nitrate (nitre) or like oxidizer, which is stirred into the dross for this purpose at the above temperature.

As above stated, the reagent employed for producing the indium-sulfur containing compound is an alkali-metal sulfide or may be substances which will produce either such sulfide or give the same effect as the sulfide under my operating conditions. The following is a list of reagents which I have used with success and with which 60-99% of the indium present in the original metal has been removed in the dross: Sulfur (S) and sodium hydroxide (NaOH); sodium sulfide ($Na_2S$) with and without sodium hydroxide; elemental sulfur and metallic sodium (Na) with and without sodium hydroxide; sulfur and sodium sulfide fused, which produces sodium polysulfide ($Na_2S_4$), with and without sodium hydroxide. The sodium hydroxide, when taking no part in the reaction to produce the indium sulfur compound, is employed as a vehicle for the alkali-metal sulfide. As a vehicle it is not necessary in the process, but is desirable to act as a diluent to prevent too violent reaction. Where sodium sulfide is used, sodium hydroxide is preferably used in order to avoid such violent reaction causing splattering, which may result when ordinary sodium sulfide alone is introduced on the bath. In the appended claims, the expression "alkali-metal sulfide" is intended to cover sulfides of the alkali metals, including sodium and potassium sulfide, as well as the above mixtures, including combining proportions of: sodium hydroxide and sulfur; sulfur and metallic sodium; sulfur and sodium sulfide fused, each of which mixtures is believed to form sodium sulfide or polysulfide when used in my process.

In the method of operation of my invention as I now prefer to practice it, the lead containing indium, cleaned if necessary by the softening operation mentioned above, is heated in a kettle provided with a stirrer to approximately 750°–1100° F. The reagents which I prefer to employ are a mixture of less than 1 to about 2.5 parts of sodium hydroxide to about 1.7 to 3 parts of fused sodium sulfide, for each part of indium to be removed. The amount of reagent used depends on the oxidizing conditions used. The metal is stirred to produce a good vortex and the mixed reagent is gradually added—impeller speeds being about 400–1000 R. P. M., depending upon the type of impeller and kettle used, which give good results. The mixing action of the reagent and the metal bath are balanced against the amount of oxidation caused by the air alone (in the case of small lots) drawn in at the vortex to produce a water-insoluble indium compound. It is important to have enough oxidation to convert the reaction products of sodium sulfide and indium into water-insoluble but acid-soluble indium compounds. Along with these products, there will be some water-soluble by-products such as zinc or tin salts and an oxidation product of sodium sulfide such as sodium sulfate. If too much air is taken in by the vortex, the amount of sodium sulfide required is increased and may amount to as much as 5 parts per part of indium removed. The reagent is charged continuously but at a slow rate. If desired, the metal bath may first be covered with the caustic soda or like vehicle and the sodium sulfide or like material fed into the vortex separately at a slow rate, using the same proportion of reagents as above outlined. It has been found that to collect 1 pound of indium, about 1.68 to about 3 pounds of sodium sulfide or equivalent are required under the best conditions, but that greater amounts are sometimes necessary, the variation depending on the percentage of indium present and other conditions. This approximate factor, however, enables the operator to calculate the approximate amount of this reagent necessary.

Although tests have shown that sodium sulfide alone will effectively remove indium from lead, the admixture of sodium hydroxide was found advantageous for practical reasons of kettle operation as above stated. The caustic soda prevents splattering and helps to keep the sodium sulfide in the fused liquid condition during the treatment period, which allows also for better mixing and more uniform distribution of the reagent through the metal bath. Because sodium hydroxide, as used in the combination of sodium sulfide and sodium hydroxide, is only a flux and diluent for the active reagent, it serves to prevent rapid oxidation and too rapid destruction of the sodium sulfide.

Continued agitation after the calculated quantity of sodium sulfide and sodium hydroxide have been added or after blue lead is obtained is advantageous because such treatment oxidizes any excess sodium sulfide present, which, otherwise, I believe would be combined with indium to form the water-leach-soluble sodium sulfo-indate. Such oxidation, as above pointed out, is necessary where water-insoluble indium compound in large quantities is to be formed in the dross in accordance with commercial practise. In indium is present in the dross as a water-leach-soluble compound, it will enter the leach liquor with zinc, tin and alkalies in the water leach which follows.

It can be recovered however by special treatment from this otherwise waste liquor but at increased expense. I have found in accordance with my invention that the water-insoluble indium residue is soluble in a boiling aqueous solution (10%) of sodium sulfide. This fact shows the importance of removing the free sodium sulfide from the dross since otherwise on water-leaching, a sodium sulfide solution occurs which will dissolve the insoluble indium compound.

The indium in the lead metal at the end of this treatment has been as low as .004% and in some instances has been less than .001% and down to traces of indium.

The sodium hydroxide-sodium sulfide dross containing the indium besides other metallic compounds has characteristics which enable the separation of indium from the other metals present by relatively simple chemical, and/or electro-chemical treatment. These desirable characteristics are not present to any appreciable degree in products obtained by the use of other processes.

The first operation of the treatment of dross resulting from the above sodium hydroxide-sodium sulfide treatment and other treatments herein below given, consists of leaching it in boiling hot water to eliminate the water-soluble sodium salts of zinc, tin, arsenic, etc., leaving the corresponding indium salts insoluble in the leach residue.

It has been found that aeration while leaching will aid in rendering the indium insoluble and for this purpose a Pachuca-type tank is preferably employed for the water-leach operation. While operating the Pachuca tank in connection with my process, the leach liquors contain consistently less than 1.0 g./l. indium corresponding to less than 1% of the indium treated in this operation. I do not consider it essential to use any oxidizing type tank but I prefer as stated to use a Pachuca-type tank for this purpose.

After filtration, the leach residue is treated with sulfuric acid to dissolve the indium. This may be done in several ways, one or the other of the two following methods being preferably employed:

(1) Soak the leach residue in concentrated sulfuric acid of approximately 60° Bé. at room temperature for several hours, preferably overnight. Thereafter add hot water of about 160–180° F. in the proportion of about 4 parts of water to 1 part of pulp. The mixture is agitated and filtered.

(2) The leach residue is heated for 1–7 hours in hot dilute sulfuric acid (approximately a 10% solution) until the free acid in the pulp remains constant, indicating that complete solution of soluble compounds has occurred. The mass is then filtered.

By either of the above methods, it has been found that in order to get good extraction, the ratio of acid to indium present should be at least 1.1 of $H_2SO_4$ (sulfuric acid) to 1 of indium.

The filtrate from the sulfuric acid leaching operation performed by either method contains the indium in soluble form and is ready for further chemical and/or electro-chemical treatment.

Very good recoveries of indium have been obtained by this process resulting in drosses containing about 99% of the original indium in the metal. The water-insoluble indium in the drosses under preferred conditions has amounted to 93–98% of the indium in the drosses.

The process as outlined above is shown diagrammatically in the accompanying flow sheet which constitutes part of this application.

The following are examples of my process. These examples are illustrative and the invention is not to be considered as limited thereto except as indicated in the appended claims. Parts refer to parts by weight except as otherwise noted.

*Example #1*

Part 1.—Removal from metal and water-leaching.

53,600 parts of impure lead containing .51% indium and from which the major portion of impurities such as zinc, tin, etc. had already been removed, was melted down in an iron kettle. Into this at about 640–1025 R. P. M. and temperature of 1015° F. was stirred a flux mix consisting of 686 parts of sodium hydroxide and 1374 parts of sodium sulfide, over a period of 5¼ hours under oxidizing conditions. Samples taken at this time indicated that additional reagent was necessary to remove the indium still present in the lead, so another 100 parts of sodium hydroxide and 300 parts of sodium sulfide was added. After 7⅔ hours total stirring time, the lead was blue and spectographic tests indicated that the indium was practically all removed. The final lead metal analyzed .0037% indium.

The dross was removed and put into water to leach out the soluble salts. The leach liquor analyzed: 1.16 grams per liter of indium, 1.45 grams per liter of zinc, 2.05 grams per liter of tin and .013 gram per liter of arsenic, which was discarded. The residue contained 21.5% of indium.

The metal balance from clean metal through the water leach is as follows:

|  | Parts by weight | Assay indium | Indium contents by weight | Percent of total |
|---|---|---|---|---|
| Metal treated | 53,600 | .51% | 273.4 | 100.00 |
| Metal at end (lead) | 52,570 | .0037% | 1.95 | .70 |
| Water-leached residue | 1,247 | 21.5% | 268.11 | 95.43 |
| Water-leached liquor (parts by volume) | 9,415 | 1.16 g./l. | 10.88 | 3.87 |
|  |  |  | 280.94 | 100.00 |

Indium loss in kettle treatment and water leach—4.57%.

Part 2.—Acid leaching of water residue.

140 parts of water leach residue was given a time leach with 1,000 parts by volume of 10% sulfuric acid at a temperature of 150° F. The leaching was continued by occasional agitation until no further decrease in acid strength was shown on analyzing the solution. The time required was about 7 hours.

The slurry was filtered and the cake washed with water.

The metal balance follows:

|  | Parts by weight | Percent indium | Parts by weight indium | Indium content percentage |
|---|---|---|---|---|
| Water leach residue | 140 | 30.7 | 42.98 |  |
| Acid leach liquor | 1,480 | 2.81 | 41.62 | 96.36 |
| Acid leach residue | 40 | 3.93 | 1.57 | 3.64 |
|  |  |  | 43.19 | 100.00 |

*Example #2*

To 49,280 parts of lead containing .51% indium was added 1,000 parts sodium hydroxide and 200 parts of sulfur. This was stirred in at about 750–1050 R. P. M. at a temperature of 1000° F. for approximately 3⅔ hours with the following results:

| | Parts by weight | Per cent indium | Parts by weight indium | Distribution |
|---|---|---|---|---|
| | | | | Per cent |
| Starting metal | 49,280 | .51 | 251 | |
| Final metal | 48,454 | .073 | 35 | 14.3 |
| Indium dross | 1,700 | 12.28 | 209 | 85.7 |
| | | | 244 | 100.0 |

The indium dross was treated by water-leaching and acid-leaching as in Example 1.

Example #3

53,160 parts of metal containing .216% indium, .28% tin and 1.14% zinc were treated with sodium hydroxide, sodium chloride and nitre to remove zinc and tin, the latter being skimmed off as a dross. The resulting metal weighed 51,500 parts containing .20% indium, .155% tin and .17% zinc.

To the 51,500 parts of metal was added 50 parts of metallic sodium and then 225 parts of sulfur stirred in at 750° F. for 1¼ hours. The dross was skimmed, after which some salammoniac and rosin was added and a small amount of additional dross removed. This was added to the first dross.

The metal balance for indium follows:

| | Parts | Percent indium | Parts indium | Percent original indium content |
|---|---|---|---|---|
| Metal at start | 53,160 | .216 | 115.2 | 100. |
| Tin-zinc dross | 529 | 2.31 | 12.3 | 10.64 |
| Indium-sulfur dross | 3,216 | 3.15 | 101.3 | 87.97 |
| Final metal (after indium removal) | 49,780 | .002 | 1.0 | .87 |
| Samples removed | 250 | .24 | .60 | .52 |
| | | | 115.2 | 100.00 |
| Cleaned metal (after removal of zinc and tin) | 51,500 | .20 | ¹ 102.9 | ¹ 89.36 |

¹ The ratio of the indium recovered from the sulfur dross as compared with that contained in the cleaned metal after removal of zinc and tin is as follows:
$$\frac{101.3}{102.9} = 98.45\% \text{ recovery}$$

The indium dross may be treated by water-leaching and acid-leaching as in Example 1.

Example #4

206,325 lbs. of metal containing 1.04% indium, 1.26% zinc and 0.10% tin were charged into the kettle, melted and heated to 700–800° F. The zinc content of the metal was reduced to 0.3% by stirring into it at 750–800° F., four successive batches of 1200 lbs. each, and one batch of 800 lbs., caustic soda. The dross formed containing the zinc was removed. After the zinc had been reduced to 0.3%, the metal was heated to about 1050° F. and while maintaining the metal within a temperature range of approximately 1000–1150° F., four treatments of the metal with 900 parts of sodium sulfide, totaling 3,600 lbs., were made. Along with the sodium sulfide, there was present a total of 1,250 lbs. of caustic soda, some being added during the course of each of the four treatments, primarily to serve as a vehicle and diluent for the sodium sulfide and to adjust the fluidity of the dross. While maintaining the metal in a temperature range of about 1000–1150° F., the four successive additions of sodium sulfide were made accompanied by the caustic soda as mentioned, the sodium sulfide and caustic soda being stirred into the metal with a stirring speed of about 400–500 R. P. M. with a kettle diameter of about 10 feet and an impeller blade of about 24 inches. The total stirring time was approximately 20 hours and 50 minutes. At the end of each treatment, the dross was skimmed from the metal before the addition of the reagents for the next treatment. Prior to each of the four removals of the dross from the metal, it was tested for soluble sodium sulfide as given above.

In the first period, the stirring was continued for 12 hours at 1050–1150° F. and at the end of that time a test showed the dross to be low in available Na₂S, but the metal still showed a content of indium. The analysis showed the indium content of the metal to have been reduced from 1.04% to less than 1%. Thereupon, 125 pounds of nitre (NaNO₃) was slowly added which oxidized the balance of the sodium sulfide and the charge was then cooled sufficiently until the dross became thick enough to skim. The dross from this first stage of the process is high in water-insoluble indium compound. The dross at end of the period of oxidation with sodium nitrate was of a white or gray color when stirred with warm water in accordance with the test for sodium sulfide given above. In the second, third and fourth stages of the process, the treatment with sodium sulfide and sodium hydroxide was carried out in substantially the same manner as in the first stage, employing respectively 8, 5¾ and 3 hours for treatment, stirring being conducted continuously in the temperature range mentioned under oxidizing conditions for a sufficient length of time with the addition of sodium nitrate until a test for water soluble sulfide showed that there was substantially none present and that the indium compound accordingly was substantially water-leach-insoluble.

Data concerning the above treatment may be summarized as follows:

| | Pounds | Per cent indium | Pounds indium |
|---|---|---|---|
| Metal treated | 206,325 | 1.04 | 2,146 |
| Final metal | 200,213 | 0.004 | 8 |
| Indium extracted | | 99.68 | 2,138 |
| Drosses produced: | | | |
| First (containing also zinc and tin) | 2,540 | 5.46 | 139 |
| Second | 2,540 | 30.99 | 787 |
| Third | 1,903 | 27.50 | 623 |
| Fourth | 3,272 | 18.60 | 598 |
| Total | | | 2,147 |

Note.—The indium produced is shown as 9 lbs. more than in the head metal. However, the figures are within the limits of analytical error.

Reagents consumed:

| | Pounds NaOH | Pounds Na₂S | Pounds nitre | Lb./lb. indium |
|---|---|---|---|---|
| For zinc removal | 5,600 | | | or .56 |
| For indium removal | 1,250 | 3,600 | | or 1.68 |
| Do | | | 825 | or .38 |
| For final refining | 200 | | | |
| Do | | | 100 | |

The above drosses were combined and hot-water-leached in a Pachuca tank, using a ratio of 5000 lbs. of water to 1000 lbs. of dross. The leach liquor contained less than 1 g./l. of indium and the recovery of indium in the water-insoluble residue was approximately 98% of the total indium in the dross.

To every 1000 parts of water-leach residue, approximately 5000 parts by volume of 10% sulfuric acid at a temperature of about 150–180° F. was added. The mass was continuously agitated until there was no further decrease in acid strength. Thereupon the slurry was filtered and the cake washed with water, producing a sulfuric acid solution of the indium.

This latter solution may then be treated by chemical or electro-chemical methods to recover the indium.

Example #5

60,330 parts of lead containing 0.22% indium were melted and held at a temperature of 1000–1100° F. At a temperature of 1080° F., 522 parts of $Na_2S$ were charged onto the surface of the agitated metal bath, forming a heavy and viscous dross of dark reddish brown color in 1 hour and 35 minutes. This treatment was repeated with 250 parts of $Na_2S$, producing a gray dross of small dry pebbles in 1 hour and 15 minutes. These drosses were leached together and sampled in the same manner as the drosses of the other tests. This liquor contained 4.39 grams per liter of free $Na_2S$, indicating that 22.7 parts of $Na_2S$ had not been consumed in this test.

Considering the fact that the commercial $Na_2S$ contains only approximately 64% of $Na_2S$, or that only 513 parts of available $Na_2S$ had been charged to the kettle with the 802 parts of commercial reagent, the analysis of the leach liquor shows that 4.43% of the available $Na_2S$ had passed unchanged into the leach liquor when the kettle dross was leached with hot water.

The metal balance is:

|  | Parts | Indium | Parts indium | Indium distribution |
|---|---|---|---|---|
|  |  | Per cent |  | Per cent |
| Head metal | 60,330 | .22 | 129.2 | 100.0 |
| Dross leach residue | 413 | 29.28 | 120.9 | 93.6 |
| Dross leach liquor | 1 5.18 | 1.45 | 7.5 | 5.8 |
| Dross metallics | 801 | .10 | .8 | .6 |
| Final metal | 56,977 | .Tr. |  |  |

1 By volume.

The dross leach residue obtained above is agitated with sulfuric acid as in Example 4 and the indium is obtained in solution which is then filtered off.

It will be noted in connection with Example 5 that approximately 4.43% of the available sodium sulfide added, passed unchanged into the leach liquor when the kettle dross was leached with hot water. This proportion of sodium sulfide present in a solution of 4.39 grams per liter is insufficient to cause a solution of any appreciable quantity of indium, as shown in the tabulation in the above example. Higher quantities of sodium sulfide contained in the dross upon leaching with hot water will, however, reduce the amount of insoluble indium material and increase the amount of indium material soluble in the leach liquor as shown in the following example which indicates that where the sodium sulfide content of the leach liquor is approximately 25.38 grams per liter, a considerable proportion, about 26.1%, of the indium passes into the leach liquor as soluble material.

Example #6

59,020 parts of lead containing 0.23% of indium were melted in the same manner as in previous tests. Into this metal, 143 parts of metallic sodium and 100 parts of elemental sulfur were stirred at a temperature of 900° F. Although the heat under the kettle had been shut off for some time before this treatment, the temperature of the bath rose to almost 1000° F., indicating the occurrence of an exothermic reaction in the metal bath, this reaction most likely being the chemical combination of Na and S to form $Na_2S$. 100 parts of NaOH were then charged into the vortex and a heavy and viscous dross formed. After one hour the appearance of the lead bath indicated complete removal of the indium, namely, blue lead appeared. The dross was leached with hot water. In addition to indium analyses of various samples taken therefrom, the clear filtrate (leach liquor) was also analyzed for free $Na_2S$. This liquor contained 25.38 grams per liter of free $Na_2S$, indicating that 57.9 parts of $Na_2S$ had not been consumed in this example and remained unoxidized producing a water soluble indium compound. This amounts to 23.85% of the $Na_2S$ formed by the chemical combination of 143 parts of Na and 100 parts of S, which were stirred into the metal bath.

The metal balance is:

|  | Parts | Indium | Parts indium | Indium distribution |
|---|---|---|---|---|
|  |  | Per cent |  | Per cent |
| Head metal | 59,020 | .23 | 135.6 | 100.0 |
| Dross leach residue | 254 | 39.36 | 100.0 | 73.7 |
| Dross leach liquor | 1 2.28 | 15.47 | 35.3 | 26.1 |
| Dross metallics | 174 | .15 | .3 | .2 |
| Final metal | 57,204 | Tr. |  |  |

1 By volume.

Since 26.1% of the indium occurred in the dross as a soluble compound because of a large amount of unconsumed $Na_2S$, this accounts for the lowered amount of insoluble indium material.

What I claim is:

1. A process for concentrating indium which comprises, heating a lead containing indium at a temperature above the melting point of lead with an alkali-metal sulfide in amount sufficient to convert the indium content into a dross and removing the dross.

2. A process for concentrating indium which comprises, heating a lead containing indium at a temperature above the melting point of lead with an alkali-metal sulfide in amount and under conditions to convert a large part of the indium content into a water-insoluble dross and removing the dross.

3. A process for recovering indium from indium bearing lead which comprises, heating the lead containing indium with an alkali-metal sulfide at a temperature of about 750–1100° F., thereby forming a dross containing water-insoluble indium material and water-leach-soluble material, and leaching the dross with water to remove said last-named material.

4. A process for recovering indium from indium bearing impure lead which comprises, mixing under oxidizing conditions by stirring at a temperature above the melting point of lead, a mass of the lead containing indium with an alkali-metal sulfide to form a dross, continuing the stirring under oxidizing conditions to oxidize any alkali-metal sulfide in the dross, to produce a substantially water-insoluble indium-containing material and a material which is soluble on leaching with water, and leaching the product with water to remove said soluble material, leaving the indium material as an insoluble residue.

5. A step in the process for recovering indium from indium bearing lead which consists in dissolving in acid the water-insoluble indium material obtained by the process of claim 4.

6. A process according to claim 4 in which the insoluble indium residue is dissolved in sulfuric acid.

7. A process for recovering indium from indium bearing impure lead which comprises, mixing by stirring at a temperature above the melting point of lead, a mixture of the lead containing indium with an alkali-metal sulfide, forming an indium sulfur compound, adding an oxidizing agent and continuing the stirring to oxidize any excess of alkali-metal sulfide to produce a dross containing water-insoluble indium material.

8. A process for recovering indium from indium bearing impure lead which comprises, mixing by stirring at a temperature above the melting point of lead, a mixture of the lead containing indium with sodium sulfide, forming an indium sulfur compound, adding nitre and continuing the stirring to oxidize any excess of sodium sulfide to produce a dross containing water-insoluble indium material.

9. A process for recovering indium from indium bearing impure lead which comprises, mixing by stirring at a temperature above the melting point of lead, a mixture of the lead containing indium with sodium sulfide, forming an indium sulfur compound, adding nitre, continuing the stirring to oxidize any excess of sodium sulfide to produce a dross containing water-insoluble indium material and by-product, and leaching said insoluble material and by-product with water to remove the by-product, leaving the indium material as an insoluble residue.

10. A process for recovering indium from indium bearing lead which comprises heating the lead containing indium with sodium sulfide and sodium hydroxide at a temperature of about 1000°–1100° F., stirring the indium containing lead, sodium sulfide and sodium hydroxide at said temperature, forming a dross containing an indium compound which is soluble when leached with water, continuing the stirring under oxidizing conditions to change said soluble compound into a water-insoluble indium compound, adding an oxidizing agent and continuing the stirring to complete the change of said soluble compound to the water-insoluble form.

11. A process for recovering indium from indium bearing lead which comprises heating the lead containing indium with sodium sulfide and sodium hydroxide at a temperature of about 1000°–1100° F., stirring the indium containing lead, sodium sulfide and sodium hydroxide at said temperature, forming a dross containing an indium compound which is soluble when leached with water, continuing the stirring under oxidizing conditions to change said soluble compound into a water-insoluble indium compound, adding an oxidizing agent, continuing the stirring to complete the change of the soluble indium compound to the water-insoluble form, and thereafter leaching the dross with water to remove any water-soluble by-products, leaving the water-insoluble indium compound.

12. A process for recovering indium from indium-bearing lead (containing also impurities such as zinc and tin), which comprises melting the indium-bearing lead containing the impurities with sodium hydroxide and sodium chloride at a temperature of about 700–800° F. with stirring, removing the dross therefrom containing zinc, tin, and other impurities, stirring the resulting metal containing lead and indium and small quantities of impurities at about 1100° F. with sodium hydroxide and sodium sulfide, thereby forming a sulfur-compound of indium, continuing the stirring in the presence of sodium nitrate after formation of the indium-sulfur compound to oxidize any excess sodium sulfide and produce a substantially water-insoluble indium containing material along with water-soluble by-product, and leaching the insoluble material and by-product with water to remove the latter, leaving the indium material as an insoluble residue.

13. A process for recovering indium from indium bearing lead which comprises, heating at a temperature above the melting point of lead, the lead containing indium with an alkali-metal sulfide capable of forming a water-insoluble sulfur compound with indium, thereby forming a dross containing water-insoluble indium material and water-soluble material, and leaching the dross with water to remove the water-soluble material, leaving the indium material as an insoluble residue.

14. A step in the process for recovering indium from indium bearing impure lead, which consists of mixing by stirring at a temperature above the melting point of lead, a mixture of the lead containing indium with an alkali-metal sulfide capable of forming a sulfur compound of indium, continuing stirring under oxidizing conditions to oxidize the reagent after formation of the indium-sulfur compound, to produce a substantially water-insoluble indium-containing material.

15. A process for recovering indium from indium bearing impure lead which comprises, mixing by stirring at a temperature above the melting point of lead, a mixture of the lead containing indium with an alkali-metal sulfide capable of forming a sulfur compound of indium, continuing the stirring under oxidizing conditions to oxidize the reagent after formation of the indium-sulfur compound, to produce a substantially water-insoluble indium-containing material and water-soluble material, and leaching said insoluble and soluble materials with water to remove the water-soluble material, leaving the indium material as an insoluble residue.

16. A step in the process for recovering indium from indium bearing lead which consists in dissolving in acid the water-insoluble indium material obtained by the step of claim 15.

17. A process for recovering indium from indium bearing lead which comprises, heating at a temperature above the melting point of lead, the lead containing indium with an alkali-metal sulfide capable of forming a water-insoluble sulfur compound with indium, thereby forming a dross containing water-insoluble indium material and water-soluble material, and leaching the dross with water to remove the water-soluble material, leaving the indium material as an insoluble residue, dissolving said residue in acid and recovering said indium.

18. A process according to claim 17 in which the acid used for dissolving the indium material is sufuric acid.

19. A process for recovering indium from indium bearing lead which comprises, heating at a temperature of about 1000°–1100° F. the lead containing indium with sodium hydroxide and sodium sulfide in sufficient amount to form a dross containing water-insoluble indium material and water-soluble material, and leaching the dross with water to remove the water-soluble material, leaving the indium material as an insoluble residue.

20. A process for recovering indium from indium-bearing lead, containing impurities, which comprises preliminarily heating the lead containing the substances mentioned with caustic alkali to form a dross containing impurities, removing said dross, heating at a temperature above the melting point of lead, the lead-containing indium thus obtained with an alkali-metal sulfide capable of forming a water-insoluble sulfur compound with indium, thereby forming a dross containing water-insoluble indium material and water-soluble material, and leaching the dross with water to remove the water-soluble material, leaving the indium material as an insoluble residue.

21. A process for recovering indium from indium-bearing lead (containing also impurities such as zinc and tin), which comprises melting the indium-bearing lead containing the impurities with sodium hydroxide and sodium chloride at a temperature of about 700–800° F. with stirring, removing the dross therefrom containing zinc, tin, and other impurities, stirring the resulting metal containing lead and indium and small quantities of impurities at about 1100° F. with sodium hydroxide and sodium sulfide in amounts sufficient to form a sulfur-compound of indium, continuing the stirring under oxidizing conditions after formation of the indium-sulfur compound to oxidize the sodium sulfide and produce a substantially water-insoluble indium containing material along with water-soluble material, and leaching the insoluble and soluble material with water to remove the water-soluble material, leaving the indium material as an insoluble residue.

22. A step in the process for recovering indium from indium bearing impure lead which consists in heating at a temperature above the melting point of lead, the lead containing indium, with a material comprising essentially an alkali-metal sulfide in sufficient quantity to convert the indium into water-insoluble indium dross.

MAX F. W. HEBERLEIN.